(12) United States Patent
Zadvinskis

(10) Patent No.: US 12,628,936 B2
(45) Date of Patent: May 19, 2026

(54) TRANSPARENT CARRYING APPARATUS

(71) Applicant: Shaun Jackson Design, Inc., Saline, MI (US)

(72) Inventor: Mark Zadvinskis, Saline, MI (US)

(73) Assignee: Shaun Jackson Design, Inc., Saline, MI (US)

( * ) Notice: Subject to any disclaimer, the term of this patent is extended or adjusted under 35 U.S.C. 154(b) by 85 days.

(21) Appl. No.: 18/675,701

(22) Filed: May 28, 2024

(65) Prior Publication Data

US 2024/0389737 A1      Nov. 28, 2024

Related U.S. Application Data

(60) Provisional application No. 63/468,885, filed on May 25, 2023.

(51) Int. Cl.
*A45F 3/04*          (2006.01)
*B32B 3/26*          (2006.01)
(Continued)

(52) U.S. Cl.
CPC ................ *A45F 3/04* (2013.01); *B32B 3/266* (2013.01); *B32B 5/028* (2013.01); *B32B 5/18* (2013.01); *B32B 7/023* (2019.01); *B32B 27/065* (2013.01); *B32B 27/08* (2013.01); *B32B 27/12* (2013.01); *B32B 27/304* (2013.01);
(Continued)

(58) Field of Classification Search
CPC . A45F 3/04; A45F 3/266; B32B 7/023; B32B 3/266; B32B 2250/03
See application file for complete search history.

(56) References Cited

U.S. PATENT DOCUMENTS 5,573,154 A * 11/1996 Tietze ....................... A45F 3/04
                                                                  190/110
6,144,616 A    11/2000 Suzuki
(Continued)

FOREIGN PATENT DOCUMENTS

CN        203419396 U      2/2014
CN        113480809 A     10/2021
(Continued)

OTHER PUBLICATIONS

Vorspack Clear Backpack Heavy Duty PVC Transparent Backpack with Reinforced Strap Stitches & Large Capacity for College Workplace Security—Black, https://www.amazon.com/Vorspack-Backpack-Transparent-Reinforced-Workplace/dp/B07X1R4HLB/ref=sr_1_3_sspa?dib=eyJ2ljoiMSJ9.PBQsjEwKSNMPpBFrmqFvw ExD5tQ4BmYLxqQElcVqy9LNmZsdBKImYpzJ_P50CgBL_U_ TXVoJ5uP9kZBOU2LmuEJrFy7v0HI3xf9zLiBEfuwmwc0K6cZE ZjFk861T2WHLU77zoXzspRqEtX68WQXqux_ wrYzqgJV92wvalXNIYj6JOUSccRa.
(Continued)

*Primary Examiner* — Derek J Battisti
(74) *Attorney, Agent, or Firm* — Fishman Stewart PLLC

(57)          ABSTRACT

A transparent carrying apparatus comprises a body including one or more first portions comprising a first layer; and one or more second portions comprising a second layer. The first layer and the second layer may be visually transparent; and the second layer may be a reinforcing layer. The first layer and the second layer may include a first transparency and a second transparency, respectively; and the degree of transparency of the first layer is greater than a degree of transparency of the second layer. The second transparency may be to a degree that items disposed within the body are visually identifiable through the one or more second portions.

14 Claims, 4 Drawing Sheets

(51) Int. Cl.

| | | |
|---|---|---|
| *B32B 5/02* | (2006.01) | |
| *B32B 5/18* | (2006.01) | |
| *B32B 7/023* | (2019.01) | |
| *B32B 27/06* | (2006.01) | |
| *B32B 27/08* | (2006.01) | |
| *B32B 27/12* | (2006.01) | |
| *B32B 27/30* | (2006.01) | |

(52) U.S. Cl.
CPC ..... *B32B 2250/03* (2013.01); *B32B 2307/412* (2013.01); *B32B 2307/54* (2013.01); *B32B 2439/46* (2013.01)

(56) References Cited

U.S. PATENT DOCUMENTS

| | | | | |
|---|---|---|---|---|
| 6,164,509 | A | * | 12/2000 | Gausling ................. A45F 3/047 224/259 |
| 6,200,300 | B1 | * | 3/2001 | Petriekis ........... B65D 75/5877 604/408 |
| 6,237,825 | B1 | | 5/2001 | Pencoske |
| 10,681,970 | B2 | * | 6/2020 | McManus ................. A45F 3/04 |

| | | | | |
|---|---|---|---|---|
| 2013/0204074 | A1 | * | 8/2013 | Belval .................... A61G 1/042 600/22 |
| 2015/0219294 | A1 | * | 8/2015 | Sreshta ................. F21V 23/005 362/96 |
| 2016/0088953 | A1 | * | 3/2016 | Benezri .................... A45F 4/00 5/655 |
| 2019/0380460 | A1 | * | 12/2019 | Marsh ........................ A45F 4/02 |
| 2024/0090637 | A1 | * | 3/2024 | Atwood ................... A45C 3/06 |
| 2024/0090648 | A1 | * | 3/2024 | Herron .................. A45C 13/02 |

FOREIGN PATENT DOCUMENTS

| | | |
|---|---|---|
| CN | 220157763 U | 12/2023 |
| TW | 495762 B | 7/2002 |

OTHER PUBLICATIONS

Staples Mesh Backpack, Black (29693), https://www.staples.com/staples-mesh-backpack-black-29693/product_2075277?cid=ps:gs:dot:nb:pmax:os&gad_source=4&gclid=CjwKCAiA34S7BhAtEiwACZzv4Ycd4XkwRrpITCJUIh6D9_KnUSOoaU4EzEfolPpB5RqeQYT3Xriu-RoC0fMQAvD_BWE, Dec. 18, 2024.

* cited by examiner

TRANSPARENT CARRYING APPARATUS

CROSS-REFERENCE TO RELATED APPLICATION

This application claims priority to U.S. Provisional Application No. 63/468,885 filed on May 25, 2023, the contents of which is hereby incorporated by reference in its entirety.

TECHNICAL FIELD

The disclosure relates generally to carrying apparatuses, and in particular, to transparent or translucent backpack configurations with reinforced layers/panels to protect delicate and/or valuable contents.

BACKGROUND

Transparent carrying articles, like clear backpacks or bags, are gaining attention as a potential safety measure in environments where large groups of people gather, especially in school districts. An underlying idea is that if the contents of a bag are visible, security personnel may be able to more easily detect weapons, contraband, or other harmful items. Such visibility may deter individuals from bringing dangerous or unlawful objects into places where they could cause harm.

In schools, where student safety is paramount, the introduction of transparent backpacks could serve as a deterrent to those considering bringing weapons onto campus. The transparency of the backpack may permit teachers, school administrators, and security personnel to quickly scan for threats without conducting intrusive searches, thus maintaining a balance between safety and student privacy. Additionally, transparent backpacks may contribute to a sense of collective responsibility, as students are more aware that their belongings are visible to others, potentially reducing the temptation to carry prohibited items.

Beyond schools, clear bags are also used in other venues where public safety is a concern, such as concerts and sporting events. With large crowds, the risk of violence or the presence of dangerous items increases, making transparent carrying articles a useful tool for event security. At these venues, security checks are often expedited when bags are clear, as it allows for quick visual inspection, reducing wait times and crowding at entry points.

Existing transparent backpacks commonly substitute clear plastic-like vinyl for conventional woven materials. With the exception of seams, zippers, and straps, existing backpacks are often clear on every surface. However, such transparent backpacks may lack protection and/or support for the contents; particularly, sensitive contents like computers and technology.

Accordingly, there is a need for a carrying apparatus that accommodates the safety concerns in populated areas while providing sufficient protection and support, including with respect to exterior forces.

DETAILED DESCRIPTION

Figure 1:
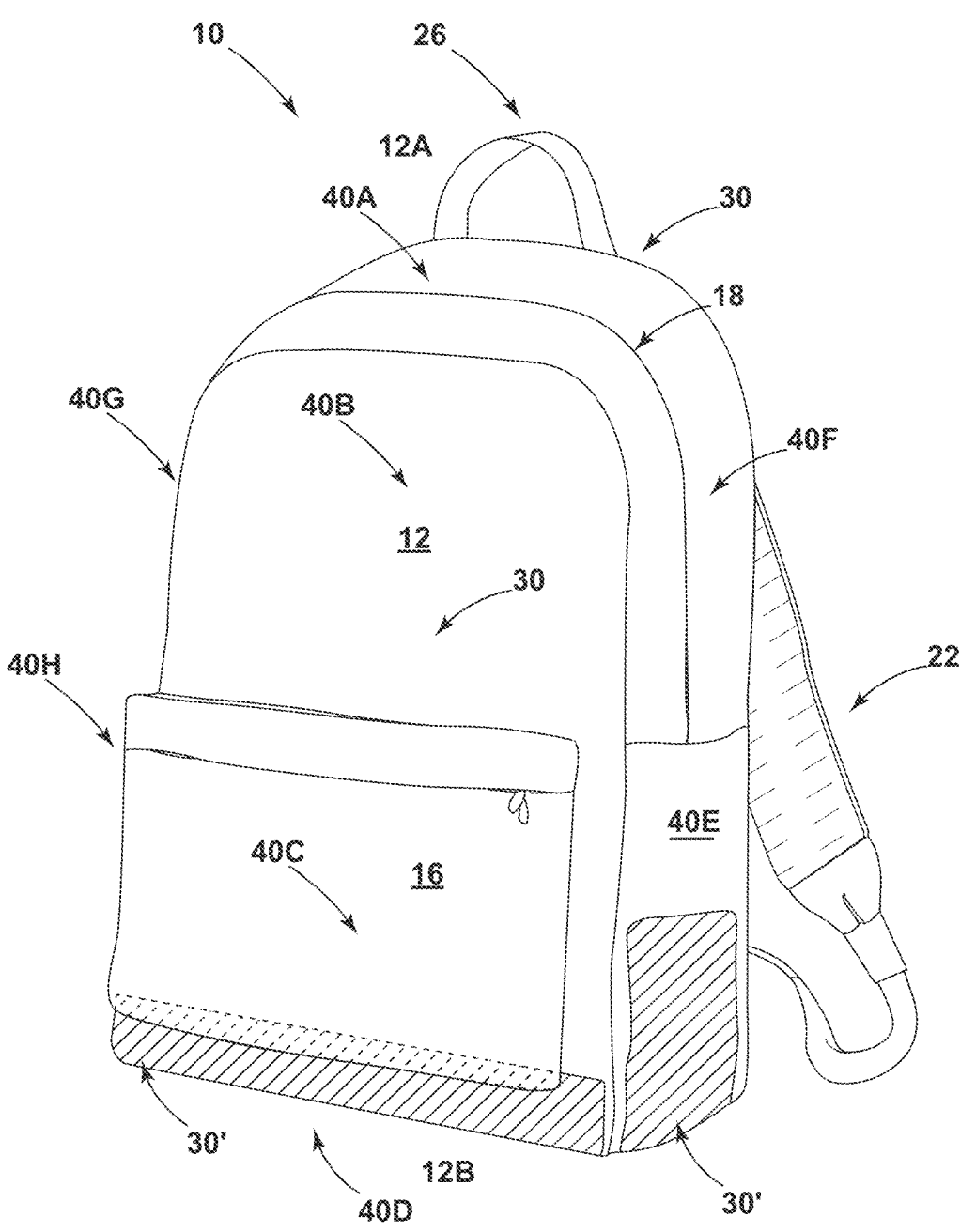
FIG. 1 illustrates a perspective view of an exemplary transparent carrying apparatus according to aspects and teaching of the present disclosure.

Referring now to the discussion that follows and the drawings, illustrative approaches to the disclosed systems and methods are described in detail. Although the drawings represent some possible approaches, the drawings are not necessarily to scale and certain features may be exaggerated, removed, or partially sectioned to better illustrate and explain the present disclosure. Further, the descriptions set forth herein are not intended to be exhaustive, otherwise limit, or restrict the claims to the precise forms and configurations shown in the drawings and disclosed in the following detailed description.

As generally illustrated in FIG. 1, the transparent carrying apparatus 10 may include a body portion 12 and/or a strap. The body portion 12 may include a storage area 16 disposed substantially on or within the body portion 12 (e.g., which may be an enclosed space). The storage area 16 may contain one or more items (e.g., personal items), such as items that are associated with attending school. For example, the one or more items may include a variety of electronic devices (e.g., phone, tablet, laptop etc.) for carrying/transportation. Further, the one or more items may include non-electronic devices that are fragile and/or sensitive to external forces (e.g., impact forces from dropping). The one or more items may be protected while disposed within the storage area 16, as impact from external forces is dissipated via the body portion 12. Additionally, the storage area 16 may be configured to open and close (e.g., in a re-closable or re-scalable manner) to receive the one or more items. The storage area may be opened and closed via a connector 18, which may comprise a zipper, a fastener, or various other connecting means to close the storage area 16 so that the one or more items are secured and/or do not unintentionally exit the storage area 16 (e.g., unintentionally fall out). The connector 18 may be disposed about a perimeter of the body portion 12 to facilitate opening and closing the transparent carrying apparatus 10. Generally, the body portion 12 may include any variety of shape, size, and/or configuration, which includes any shape or form of carrying bag/apparatus such as laptop bags, messenger bags, backpacks, purses, briefcases and the like.

Figure 2:
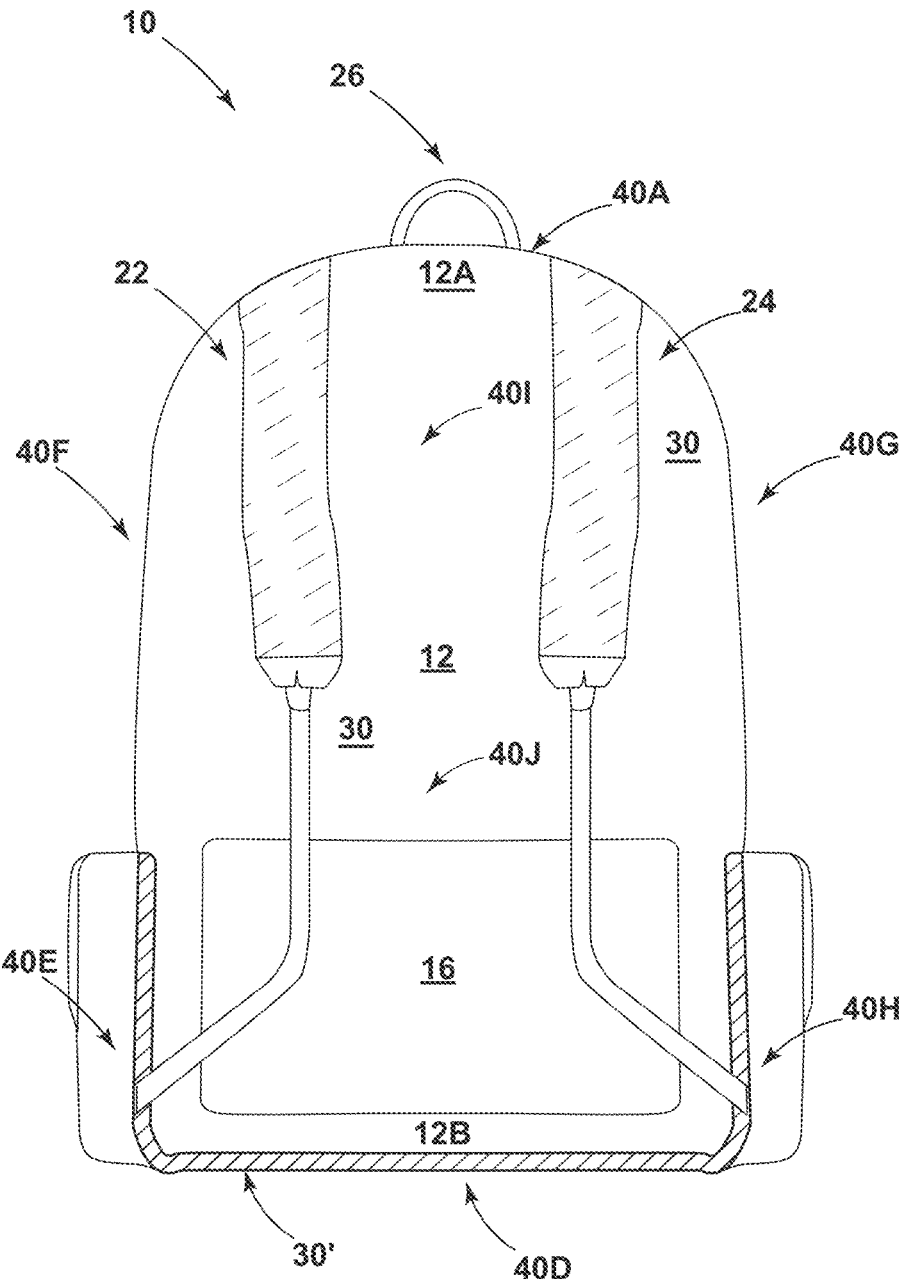
FIG. 2 illustrates a rear view of an exemplary transparent carrying apparatus according to aspects and teaching of the present disclosure.

With embodiments, such as generally illustrated in FIGS. 1 and 2, one or more straps may be connected with the body portion 12 to facilitate carrying and/or transportation of the transparent carrying apparatus 10. The one or more straps may be connected to an outer surface of the body portion 12 at one or more positions. The one or more positions and the shape/configuration of the one or more straps may correspond to a variety of carrying positions for a user of the transparent carrying apparatus 10. For example, the one or more straps may include a first strap 22 and/or a second strap 24 connected at a first end 12A of the body portion 12. The first strap 22 and the second strap 24 may extend towards and may be connected to a second end 12B of the body portion 12 (e.g., the first end 12A opposite the second end 12B). The first strap 22 and the second strap 24 may be configured to facilitate carrying the transparent carrying apparatus 10, such as via a shoulder or a back of a user.

Additionally, the one or more straps may include a third strap 26. The third strap 26 may be connected to the first end 12A of the body portion 12 and may be a loop-shape to facilitate carrying of the transparent carrying apparatus 10, such as via a hand of a user and/or to facilitate hanging on a hook. Any number of straps may be connected to the body portion 12 in any variety of manner that which a user may transport, hold, or support a backpack, bag, or the like.

As illustrated in FIGS. 1 and 2, the body portion 12 of the transparent carrying apparatus 10 may include various quantities of one or more first portions 30 and/or one or more second portions 30', further shown as a collection of sides/panels 40 defining the shape of the body portion 12. The body portion 12 (e.g., the one or more first portions 30 and/or the one or more second portions 30') may be comprised of a plurality of panels 40, such as a first panel 40A, a second panel 40B, a third panel 40C, a fourth panel 40D, a fifth panel 40E, a sixth panel 40F, a seventh panel 40G, an eighth panel 40H, a ninth panel 40I, and/or a tenth panel 40J. The plurality of panels 40 may be connected to one another to form the body portion 12 (e.g., as a combination of first portions 30 and second portions 30'). In an embodiment, the first panel 40A may be disposed at a first end of the body portion 12; and further, the second panel 40B and the third panel 40C may be disposed on a front side of the body portion 12. The fourth panel 40D may be disposed substantially toward the second end of the body portion 12 (e.g., opposite to the first end). The fifth panel 40E and the sixth panel 40F may be connected to form a first side wall of the body portion 12; and, in a similar manner, the seventh panel 40G and the eighth panel 40H may be connected to form a second side wall of the body portion 12. The ninth panel 40I and the tenth panel 40J may be connected to form a back of the body portion 12 (e.g., or rear, where the bag would contact a user's back).

In embodiments, the size and/or shape of the body portion 12 may vary with different configurations of panels 40. Including greater and lesser quantities of panels 40 may alter the size/shape of the body portion 12, as the transparent carrying apparatus may be any shape of carrying bag/device.

In embodiments, the one or more first portions 30 may correspond to any of the panels 40A-J. The one or more first portions 30 may be non-reinforced regions/areas of the body portion 12. Further, the one or more first portions 30 may include any degree of transparency, but when considering the transparency of the body portion 12 as a whole, the one or more items within the body portion 12 are generally identifiable. In this manner, varying combinations of the one or more first portions 30 may include different degrees of transparency but provide a generally transparent body portion 12. With embodiments, the one or more second portions 30' may correspond to any of the panels 40A-J. The one or more second portions 30' may be located proximate panels 40 of the body portion 12 that are likely to contact exterior surfaces (e.g., such as tables, benches, floors, etc.). For example and without limitation, the one or more second portions 30' may be disposed substantially proximate the fourth panel 40D, the fifth panel 40E, and/or the eighth panel 40H (e.g., to generally cover the bottom and bottom-proximate sides of the body portion 12). In further embodiments, but not shown, the one or more second portions 30' may be disposed substantially proximate the first panel 40A, the second panel 40B, the third panel 40C, the sixth panel 40F, the seventh panel 40G, the ninth panel 40I, and/or the tenth panel 40J.

In embodiments, such as generally illustrated in FIG. 1, the one or more second portions 30' may be disposed at a variety of locations/positions about the body portion 12 and may provide added support (e.g., load carrying support, e.g., in a base portion) and/or protect the one or more items from damage, such as caused by external forces (e.g., due to dropping or swinging the transparent carrying apparatus 10). The body portion 12 may include any quantity, configuration, and/or arrangement of second portions 30' to substantially protect items within the storage area 16 from external forces/impact. Generally, the one or more second portions 30' may be positioned about the body portion 12 at locations where weight or load force may be greater (e.g., a bottom portion of an apparatus) and/or impact can be expected to occur (e.g., from dropping the transparent carrying apparatus). Additionally or alternatively, the one or more second portions 30' may be positioned on edges or corners of the body portion 12. For example, it may be likely that the transparent carrying apparatus 10 contacts other surfaces/items at corners and/or edges of the body portion 12; therefore, the one or more second portions 30' may limit forces from acting upon items within the storage area 16.

In examples, such as generally illustrated in FIGS. 1-4, the one or more first portions 30 of the body portion 12 may include a first layer 50 and/or a second layer 52. The first layer 50 and/or the second layer 52 may include one or more of a variety of shapes, sizes, materials, and/or configurations. For example and without limitation, the first layer 50 and/or the second layer 52 may comprise any variety of polymer/plastics material, TPU, or transparent PVC which can, for instance, each include a 0.75 mm thickness. For example, the first layer 50 and the second layer 52 may be substantially transparent such that items within the storage area 16 are visible from outside the body portion 12. The first layer 50 and the second layer 52 may be substantially transparent such that the size/width of the area between the first layer 50 and the second layer 52 does not obstruct vision of the contents of the storage area 16. Additionally, the material of the first layer 50 and/or the second layer 52 may be substantially flexible and supportive (e.g., for suitable use as a backpack, purse, or other carrying accessory). In various embodiments, some the one or more first portions 30 may include only the first layer 50, and the remaining one or more first portions 30 may include at least the first layer 50 (e.g., the second layer 52 and/or additional layers).

In further embodiments where the first layer 50 and the second layer 52 are included within the one or more first portions 30, the body portion 12 may be formed by joining (e.g., sealing) the first layer 50 and the second layer 52 such that the first layer 50 is an inner layer and the second layer 52 is an outer layer. The first layer 50 may contact the one or more items within the storage area 16. The first layer may be connected with the second layer such that a sealed space or region 60 is defined or formed therebetween. The sealed space or region 60 may comprise an air pocket or air layer which may assist in the dissipation of external forces. The sealed space or region 60 may additionally prevent crumbs and/or debris from collecting between the first layer 50 and the reinforcing layer 70 (further described); and also, between the second layer 52 and the reinforcing layer 70.

Figure 3:
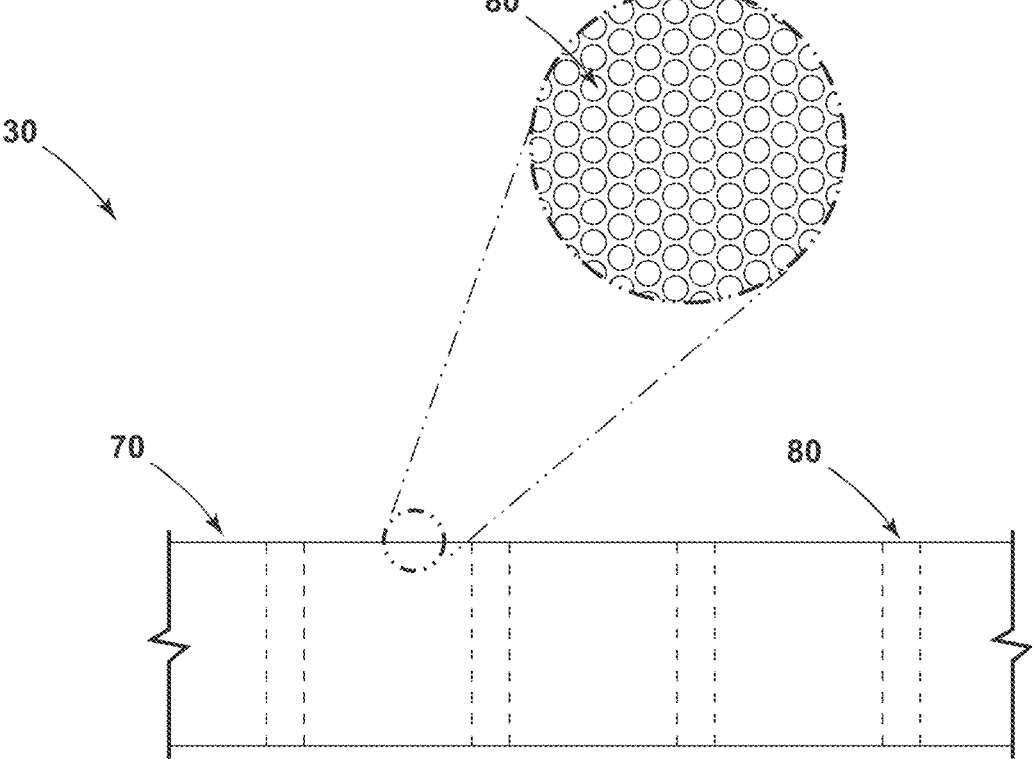
FIG. 3 illustrates a partial sectional view of an exemplary reinforcing layer of a transparent carrying apparatus according to aspects and teaching of the present disclosure.

With embodiments, such as generally illustrated in FIGS. 3 and 4, the one or more second portions 30' may include a reinforcing layer 70 disposed between the first layer 50 and the second layer 52. The reinforcing layer 70 may be disposed within the sealed space or region 60 defined or formed between the first layer 50 and the second layer 52, providing support for the one or more second portions 30' of the body portion 12. For example and without limitation, a reinforcing layer 70 may include one or more of a variety of shapes, sizes, materials, and/or configurations. The reinforcing layer 70, as shown in FIG. 3, may include a mesh-like, perforated ethylene vinyl acetate (EVA), molded PVC with air pockets injected or sealed, expanding-mesh, shock-absorbing, generally expanding, closed-cell foam, open-cell foam, and/or semi-transparent material. The reinforcing layer 70 may be configured to absorb/dissipate impact to the body portion 12, thus protecting the one or more items within the storage area 16 from impact forces. In various other embodiments, the reinforcing layer 70 may be disposed within various inner partitions (not shown) that may be included or provided within the body portion 12. Additionally, the body portion 12 is not limited to a single reinforcing layer 70, but may include one or more reinforcing layer 70.

In embodiments, such as generally shown in FIG. 3, the reinforcing layer 70 may include one or more apertures 80 that may provide transparency and/or force absorbing qualities. The reinforcing layer 70 may include a minimum quantity of apertures 80 such that the reinforcing layer 70 may not obstruct the visual identification of items (e.g., personal items) included within the storage area 16 and may provide structural support (e.g., for loading and/or to absorb exterior impact forces). For example, in some applications, it may be desired to identify weapons (e.g., guns, knives, etc.) among the contents of a storage area 16. In embodiments for such applications, a minimum degree of visibility may be needed to help identify such items. The reinforcing layer 70 may include an appropriate distribution and quantity of apertures 80 to provide sufficient transparency (e.g., even when combined with the first layer 50 and the second layer 52).

With embodiments, such as generally illustrated in FIGS. 1-4, the body portion 12 includes the one or more first portions 30 (excluding the reinforcing layer 70); and further includes the one or more second portions 30' (including the reinforcing layer 70 and at least the first layer 50) to protect the one or more items disposed within the storage area 16. In the layered configuration shown in FIGS. 4A and 4B, the first layer 50 may include a first transparency, the reinforcing layer 70 may include a second transparency, and the second layer 52 may include a third transparency. In various embodiments, the first transparency may be substantially the same as or different from the third transparency. The first transparency and/or the third transparency may be greater than the second transparency, for example, due to the reinforcing layer 70 marginally limiting or interfering with visibility through the body portion 12. As indicated previously, the body portion 12 may include any variety of panels, straps, first portions (non-reinforced regions) 30, and/or second portions (reinforced regions) 30' such that the one or more items within the storage area 16 may be sufficiently identified as safe items (e.g., which can be an identification of non-weapon items). The size and distribution of the one or more first portions (30) and the one or more second portions 30' may be such that all items within the storage area 16 (or multiple storage areas) can be identified and/or cleared via visual inspection. Size and/or quantity of the one or more second portions 30' may change with varying body portion 12 shapes and sizes; as such, multiple configuration are contemplated.

In embodiments, the first layer 50 may be sealed with the second layer 52 such that the reinforcing layer 70 is not exposed (in embodiments where the one or more second portions include the first layer 50, the reinforcing layer 70, and the second layer 52). The first layer 50 may provide an inner barrier for debris and other small items from entering the one or more apertures 80 of the reinforcing layer 70. As is common with carrying bags, remnants of food and other trash may accumulate at the bottom. In this manner, the first layer 50 and the second layer 52 can help isolate or seal the reinforcing layer 70 from debris and prolong the integrity and visibility/transparency of the reinforcing layer 70.

With examples, the body portion 12 may include a substantially transparent structure where the majority of the one or more items can be at least partially viewed. For example and without limitation, the entirety of the one or more items does not need to be viewed to successfully identify an item. In this manner, the body portion 12 may provide a general view of the majority of the one or more items disposed within the storage area 16.

As is contemplated with previous embodiments, but not shown, the body portion 12 may include additional storage areas which may further include one or more reinforcing layer 70. Internal partitions and/or additional storage areas may be included in varying body portion 12 shapes, sizes, and/or configurations.

Figure 4A:
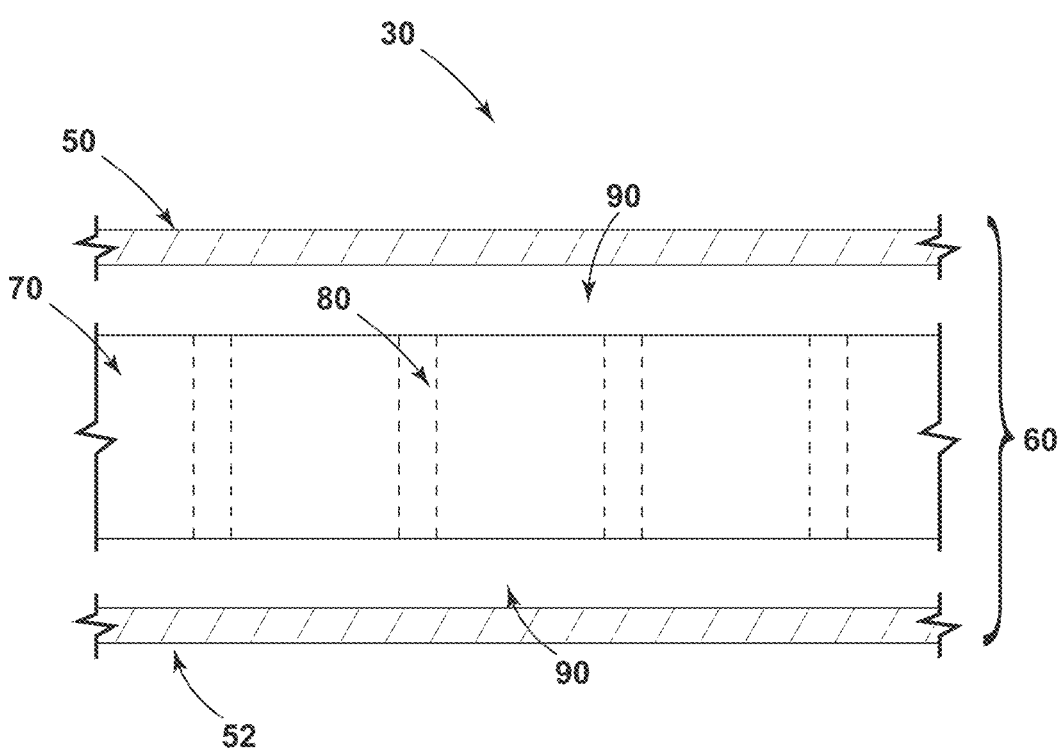
FIG. 4A and FIG. 4B illustrate partial sectional views of an exemplary first layer, second layer, and reinforcing layer of a transparent carrying apparatus according to aspects and teaching of the present disclosure.
Figure 4B:
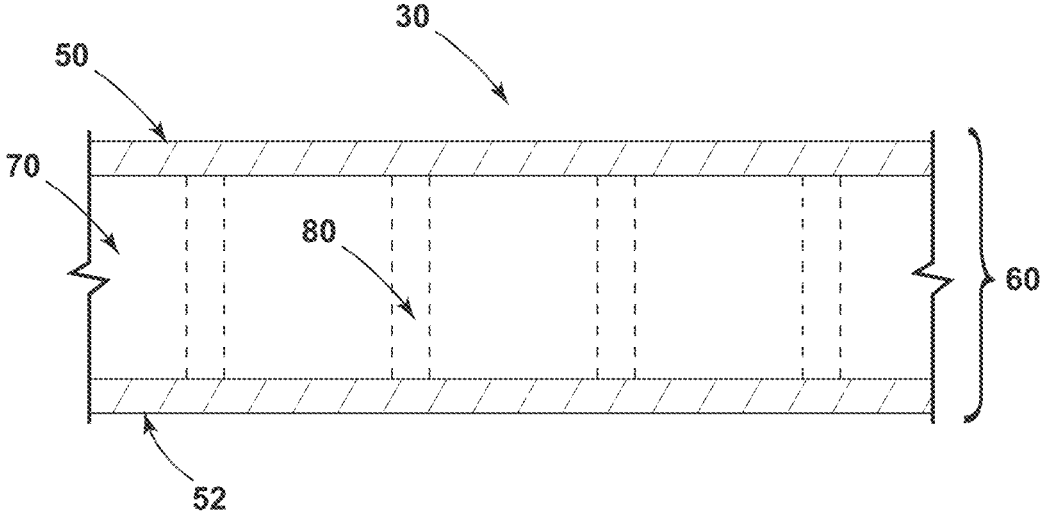

In embodiments, such as generally illustrated in FIG. 4A and FIG. 4B, the body portion 12 may include a first state (e.g., FIG. 4A), in which the body portion 12 is not in contact with any external surface, and a second state (e.g., FIG. 4B), in which the body portion 12 is in contact with an external surface. In the first state, air pockets 90 may be disposed about (e.g., above and below) the reinforcing layer 70 because no forces are exerted on the first layer 50 or the second layer 52. As the first layer 50 experiences an external force, the air pockets 90 may be evacuated or dissipated, and the first layer 50 and the second layer 52 may contact the reinforcing layer 70. Additionally, depending on the material and configuration of the reinforcing layer 70, the reinforcing layer 70 may compress to absorb impact forces (e.g., which may be affected by or facilitated via the quantity and size of apertures 80).

In embodiments of the present disclosure, the body portion 12 may be continuously bonded across the extent of the material, or the layers may be joined during manufacture (e.g., by joining the first layer 50 and the second layer 52 at the welt, whether stitched or heat/glue bonded).

When introducing elements of various embodiments of the disclosed materials, the articles "a," "an," "the," and "the" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

While the preceding discussion is generally provided in the context of a material used in connection with epoxies, it should be appreciated that the present techniques are not limited to such limited contexts. The provision of examples and explanations in such a context is to facilitate explanation by providing instances of implementations and applications. The disclosed approaches may also be utilized in other contexts or configurations.

While the disclosed materials have been described in detail in connection with only a limited number of embodiments, it should be readily understood that the embodiments are not limited to such disclosed embodiments. Rather, that disclosed can be modified to incorporate any number of variations, alterations, substitutions or equivalent arrangements not heretofore described, but which are commensurate with the spirit and scope of the disclosed materials.

Additionally, while various embodiments have been described, it is to be understood that disclosed aspects may include only some of the described embodiments. Accordingly, that disclosed is not to be seen as limited by the foregoing description, but is only limited by the scope of the appended claims.

What is claimed is:

1. A transparent carrying apparatus, the carrying apparatus comprising:
a body including:
one or more first portions comprising a first layer; and
one or more second portions comprising a second layer;
wherein the first layer and the second layer are visually transparent; the second layer is a reinforcing layer; the first layer and the second layer have a first transparency and a second transparency, respectively; a degree of transparency of the first layer is greater than a degree of transparency of the second layer; the one or more second portions comprise a visually transparent third layer having a third transparency; and the first layer is sealed with the third layer creating an air pocket disposed between the first layer and the third layer.

2. The transparent carrying apparatus of claim 1, wherein the second transparency is to a degree that items disposed within the body are visually identifiable through the one or more second portions.

3. The transparent carrying apparatus of claim 1, wherein the second layer is disposed substantially at or about a bottom portion of the body.

4. The transparent carrying apparatus of claim 1, wherein the second layer is disposed at least partially within one or more sides of the body.

5. The transparent carrying apparatus of claim 1, wherein the second layer comprises a plurality of spaced apart apertures.

6. The transparent carrying apparatus of claim 1, wherein the second layer is configured to limit exterior forces from interacting with one or more items within the body.

7. The transparent carrying apparatus of claim 6, wherein the second layer includes an expanding mesh or mesh-like material.

8. The transparent carrying apparatus of claim 6, wherein the second layer includes a molded PVC material with one or more air pockets.

9. The transparent carrying apparatus of claim 6, wherein the second layer includes closed-cell or open-cell foam.

10. The transparent carrying apparatus of claim 1, wherein the first layer and the second layer are flexible.

11. The transparent carrying apparatus of claim 1, wherein the one or more second portions comprise the first layer.

12. The transparent carrying apparatus of claim 1, wherein the first layer and the third layer limit debris from contacting the second layer.

13. The transparent carrying apparatus of claim 1, wherein the second transparency is less than at least one of the first transparency and the third transparency.

14. The transparent carrying apparatus of claim 1, wherein the second layer is configured to compress upon contacting the first layer or the third layer.

* * * * *